(12) United States Patent
Wieland et al.

(10) Patent No.: US 6,413,449 B1
(45) Date of Patent: Jul. 2, 2002

(54) METHOD OF USING CATALYST FOR STEAM REFORMING OF ALCOHOLS

(75) Inventors: Stefan Wieland, Offenbach; Frank Baumann, Alzenau; Frank Adam; Stefan Andersch, both of Freigericht, all of (DE)

(73) Assignee: Degussa-Huls Aktiengesellschaft (DE)

( * ) Notice: Subject to any disclaimer, the term of this patent is extended or adjusted under 35 U.S.C. 154(b) by 0 days.

(21) Appl. No.: 09/413,878

(22) Filed: Oct. 7, 1999

(30) Foreign Application Priority Data

May 22, 1999 (EP) .............................. 99110069

(51) Int. Cl.⁷ .............................. C07C 1/02; C01B 3/02; C01B 3/26
(52) U.S. Cl. ...................... 252/373; 423/648.1; 423/652
(58) Field of Search .................. 502/329, 333, 502/339, 349, 350, 351, 355, 439, 527.11, 527.18, 527.19; 420/463, 497, 513; 423/648.1, 652; 252/373

(56) References Cited

U.S. PATENT DOCUMENTS

| | | | | |
|---|---|---|---|---|
| 3,839,225 A | * | 10/1974 | Acres | 252/432 |
| 4,025,606 A | * | 5/1977 | Acres | 423/245 |
| 4,077,913 A | * | 3/1978 | Acres et al. | 252/462 |
| 4,188,490 A | * | 2/1980 | Hinnenkamp et al. | 560/245 |
| 4,358,951 A | * | 11/1982 | Chang | 73/23 |
| 4,716,859 A | * | 1/1988 | Konig et al. | 123/3 |
| 4,743,576 A | | 5/1988 | Schneider | |
| 4,780,300 A | * | 10/1988 | Yokoyama et al. | 423/415 A |
| 4,913,842 A | * | 4/1990 | Yoneoka et al. | 252/373 |
| 4,927,857 A | * | 5/1990 | McShea, III et al. | 518/703 |
| 5,414,176 A | * | 5/1995 | Amariglio et al. | 585/500 |
| 5,559,065 A | * | 9/1996 | Lauth et al. | 502/5 |
| 5,616,806 A | * | 4/1997 | Nagata et al. | 564/423 |
| 5,635,439 A | * | 6/1997 | Fukui et al. | 502/328 |
| 5,637,259 A | * | 6/1997 | Galuszka et al. | 252/373 |
| 5,672,629 A | | 9/1997 | Heil | |
| 5,899,678 A | * | 5/1999 | Thomson et al. | 431/2 |
| 6,025,403 A | * | 2/2000 | Marler et al. | 518/703 |
| 6,051,163 A | * | 4/2000 | Kumberger et al. | 252/373 |
| 6,083,425 A | * | 7/2000 | Clawson et al. | 252/372 |
| 6,114,279 A | * | 9/2000 | Fukui et al. | 502/342 |
| 6,123,913 A | * | 9/2000 | Clawson et al. | 423/652 |
| 6,126,908 A | * | 10/2000 | Clawson et al. | 422/190 |

FOREIGN PATENT DOCUMENTS

| | | |
|---|---|---|
| DE | 197 21 751 | 1/1999 |
| EP | 0 614 698 | 9/1994 |
| EP | 0 864 360 | 9/1998 |
| EP | 0884273 | 12/1998 |
| FR | 2 567 866 | 1/1986 |
| GB | 2 276 332 | 9/1994 |
| JP | 57007255 | 1/1982 |

(List continued on next page.)

OTHER PUBLICATIONS

New Catalytic Functions of Pd–Zn, Pd–Ga, Pd–In, Pt.–Zn, Pt.–Ga and Pt.–In Alloys in the Conversions of Methanol, Catalyst Letter 54, (1998) 119–123, Iwasa.

(List continued on next page.)

*Primary Examiner*—Steven P. Griffin
*Assistant Examiner*—Cam N. Nguyen
(74) *Attorney, Agent, or Firm*—Smith, Gambrell & Russell, LLP

(57) ABSTRACT

A catalyst is disclosed for the steam reforming of alcohols, which contains a palladium/zinc alloy and zinc oxide as catalytically active components. The alloy catalyst is a catalytically active component deposited on at least one support material which can be aluminum oxide, aluminum silicate, titanium oxide, zirconium oxide, zeoliths and mixtures or mixed oxides thereof.

13 Claims, 1 Drawing Sheet

FOREIGN PATENT DOCUMENTS

| | | | |
|---|---|---|---|
| JP | 60013038 A | * | 1/1985 |
| JP | 60-82137 | | 5/1985 |
| JP | 60137434 A2 | | 7/1985 |
| JP | 03196839 A | | 12/1989 |
| JP | 04362001 | | 6/1991 |
| JP | 05049930 | | 3/1993 |
| WO | WO89/00886 | | 2/1989 |

OTHER PUBLICATIONS

European Search Report dated Nov. 15, 1999 in corresponding foreign counterpart application No. 99110069.

HIghly Selected Supported Pd Catalysts for Steam reforming of Methanol, Iwasa et al., Catalysis Letters 19, (1993) 211–216.

Steam Reforming of Methanol over Pd/ZnO: Effect of the Formation of PdZn Alloys Upon Reaction, N. Iwasa et al., Appl. Catalysis A 125, 1995, 145–157.

Selective PdZn Alloy Formation in the Reduction Pd/ZnO Catalysts, Bull. Chemical Society Japan 71, 1451–1455 (1988), Iwasa et al.

Steam Reforming of Methanol over Ni, Co, Pd and Pt supported on ZnO, Reaction, Kinet. Catal. Letter, vol. 55, No. 2, 349–353 (1995), Iwasa et al.

New Catalytic Functions o Pd–Zn, Pd–Ga, Pd–In, Pt.–Zn, Pt.–Ga and Pt.–In Alloys in the Conversions of Methanol, Catalyst Letter 54, (1998) 119–123, Iwasa.

* cited by examiner

METHOD OF USING CATALYST FOR STEAM REFORMING OF ALCOHOLS

The present invention relates to a catalyst for the steam reforming of alcohols, which catalyst contains a palladium/zinc alloy and zinc oxide as catalytically active components. The catalyst is used in particular for the steam reforming of methanol to produce a hydrogen-rich gas that can be used as a fuel for vehicles powered by fuel cells.

The steam reforming of methanol in the presence of catalysts is a known process for producing hydrogen-rich gas mixtures, and is based on the following endothermic reaction:

Steam reforming of methanol:

$$CH_3OH + H_2O \rightarrow 3H_2 + CO_2 \quad \Delta H > 0 \qquad (1)$$

The following secondary reactions may occur:
Reforming of methanol by methanol cleavage:

$$CH_3OH \rightarrow CO + 2H_2 \quad \Delta H > 0 \qquad (2)$$

and

CO conversion:

$$CO + H_2O \leftrightarrow CO_2 + 3H_2 \quad \Delta H < 0 \qquad (3)$$

In the steam reforming according to reaction equation (1) the steam is used in excess. The so-called "steam to carbon ratio" (S/C) is used to characterize the excess water that is used. Normally a value for S/C of between 1.2 and 2.0 is chosen. In the case of the reforming of methanol S/C is identical to the molar ratio of water to methanol.

For use in fuel cells gas mixtures are required that have a low carbon monoxide content with a high hydrogen content, since carbon monoxide deactivates the anode catalyst at which the oxidation of the fuel takes place. Normally amounts of carbon monoxide in the fuel of below 100 ppm, preferably less than 10 ppm, are required.

If the fuel is obtained by reforming methanol, this requirement can at the present time only be met by a subsequent purification of the reformate gas. The effort and expenditure involved are less the lower the carbon monoxide content in the reformate gas.

For use in vehicles, for reasons of space and weight reforming catalysts are required that have a very high specific hydrogen productivity and a high selectivity, the selectivity of the formation of carbon dioxide being used to characterize the selectivity of the steam reforming.

The specific hydrogen productivity $P_{Cat}$ of the catalyst is understood within the scope of the present invention to denote the volume $V_{H2}$ of hydrogen produced per unit mass $M_{Cat}$ of the catalyst and reaction time t, wherein the catalyst mass is expressed in kilograms, the reaction time is expressed in hours, and the volume is expressed in standard cubic metres:

$$P_{Cat} = \frac{V_{H2}}{M_{Cat} \cdot t} \left[ \frac{Nm^3}{kg_{Cat} \cdot h} \right] \qquad (4)$$

The carbon dioxide selectivity $S_{CO2}$ of the steam reforming is calculated with the aid of the partial pressures of the carbon dioxide $P_{CO2}$ and carbon monoxide $P_{CO}$ that are formed $$S_{CO2} = \frac{P_{CO2}}{P_{CO2} + P_{CO}} \ [\%] \qquad (5)$$

A high specific activity is the precondition for achieving a high space-time yield, which enables the volume of the reactor used in the steam reforming to be kept small. The space requirement for the gas purification can also be reduced by a high selectivity.

EP 0687648 A1 describes a two-stage process for carrying out the methanol reforming, in which the methanol is incompletely converted in the first stage in a heat transmission-optimized process at a high specific catalyst loading, followed by reaction in a conversion-optimized second stage at a lower specific catalyst loading that completes the methanol conversion. In the first stage the catalyst is charged as high as possible, preferably to produce more than 10 Nm³/h H₂ per kilogram of catalyst. Pellet catalysts and also catalyst-coated metal sheets are proposed as catalyst forms.

Catalysts comprising the base metals copper, zinc, chromium, iron; cobalt and nickel are predominantly used for the methanol reforming. Catalysts based on CuO/ZnO, with which selectivities of more than 95% can be achieved, are particularly advantageous. Catalysts are known that consist completely of CuO and Zno and that can be obtained for example by co-precipitation from a solution of copper nitrate and zinc nitrate. After the co-precipitation the metal obtained is normally calcined in air in order to decompose and convert the precipitated compounds of the metals into the corresponding oxides. Finally the catalyst is reduced, for example, in the gaseous phase.

Alternatively so-called supported catalysts may also be used, in which a porous support or a finely divided, porous support material is impregnated with solutions of copper nitrate and zinc nitrate, and then calcined and reduced. In these cases aluminum oxide is mainly used as a support or support material, although zirconium oxide, titanium oxide, zinc oxide and zeoliths may also be used.

The finely divided catalyst materials thus obtained are as a rule processed into spherical shaped bodies, so-called pellets, or applied in the form of a coating to carrier bodies. These catalysts are hereinafter termed coated catalysts in order to distinguish them from the pellet catalysts. The processes known in the production of monolithic vehicle exhaust gas catalysts, may for example, be used to coat the carrier bodies. To this end the finely divided catalyst material is, for example, dispersed in water, optionally with the addition of suitable binders. The carrier bodies are then coating with the catalyst material by immersion in the coating dispersion. In order to fix the coating to the carrier body, the coated carrier body is dried and then calcined.

The carrier bodies for the coated catalysts serve only as a substrate for the catalytically active coatings. These carrier bodies are macroscopic bodies that must not be confused with the support material for the catalytically active components. Heat exchange metal sheeting or honeycomb bodies of ceramic materials or metal foils are suitable as carrier bodies. For example, the honeycomb bodies made of cordierite that are also used for purifying exhaust gases from combustion engines may be used for this purpose. These bodies comprise axially parallel flow channels for the reactants arranged in a narrow grid over the cross-section. The number of the flow channels per unit cross-sectional area is termed the cell density. The wall surfaces of these flow channels carry the catalyst coating. From DE 19721751 C1 and EP 0884273 a1 it is known that catalysts based on CuO/ZnO shrink by up to 40% and suffer a loss of specific activity during operation. DE 19721751 C1 solves the problem of shrinkage of catalyst layers on a metal sheet by introducing expansion gaps in the layers. According to EP 0884273 A1 the decreasing activity of a pellet packing of a Cu/ZnO catalyst on an aluminum oxide support can be at least partially reversed by periodic regeneration.

In JP 57007255 A2 (according to CA 96:145940) catalysts are described that are obtained by a two-stage impregnation of zirconium oxide-coated aluminum oxide pellets with one or two metals and/or metal oxides of copper, zinc, chromium, iron, cobalt and nickel, and with platinum or palladium. A typical catalyst contains 10 wt. % of copper oxide, 0.3 wt. % of palladium and 20 wt. % of zirconium oxide on the aluminum oxide pellets.

In addition to the catalysts based on base metals the noble metals of the platinum group, in particular platinum, palladium and rhodium on oxidic support materials such as aluminum oxide, titanium oxide and zirconium oxide, are also used for the reforming of methanol. These catalysts lead to the cleavage of methanol according to reaction equation (2) with a content of carbon monoxide in the product gas of up to 33 vol. %. Such catalysts are less suitable for the steam reforming of methanol. EP 0201070 A2, JP 60137434 A2 (according to CA 104:185977), JP 04362001 A (according to WPI 93-033201) and JP 03196839 A (according to WPI 91-298480) are examples thereof.

JP 60082137 describes a catalyst for the methanol cleavage that contains at least one of the noble metals platinum and palladium on an aluminum oxide support, the support having been coating with zinc oxide and/or chromium oxide in a preliminary treatment. For the preliminary coating the aluminum oxide support is impregnated with an aqueous solution of zinc nitrate and/or chromium nitrate and then calcined. Following this the pretreated support is impregnated with an aqueous solution of a noble metal compound, dried, calcined, and reduced under hydrogen.

It is furthermore known that catalysts that contain palladium on a zinc oxide support may also be employed for the steam reforming of methanol. In "Highly selective supported Pd catalysts for steam reforming of methanol", Catal. Lett. 19 (1993) 211–216, N. Takezawa et al. investigated the dependence of the specific selectivity of various powdered catalysts of palladium on zinc oxide. The catalysts are prepared by impregnating zinc oxide with palladium nitrate $Pd(NO_3)_2$, drying, and calcining for 3 hours at 500° C. in air. Powdered catalysts with a palladium content of 1 wt. % exhibit a high selectivity of 97% for carbon dioxide. The hydrogen productivity is however only 0.6 $Nm^3/(kg·h)$.

In JP 05049930A powdered catalysts of palladium and zinc oxide are described that are produced by co-precipitation of palladium nitrate and zinc nitrate followed by calcination at 500° C. The largest hydrogen productivity of 2.7 $Nm^3/(kg·h)$ at 220° C. is obtained with a catalyst that contains 15 wt. % of palladium.

N. Takezawa et al. in "Steam reforming of methanol over Pd/ZnO: Effect of the formation of PdZn alloys upon reaction", Appl. Catal. A 125, 1995, 145–157, point out that the catalytic performance of palladium/zinc oxide catalysts can be substantially improved by the formation of a PdZn alloy. In order to produce such a catalyst zinc oxide is first of all impregnated with palladium nitrate, dried, and calcined at 500° C. in air for 3 hours. The PdZn alloy is formed by reduction of the catalyst at elevated temperatures. The investigations of Takezawa show that the alloy formation is complete only at reduction temperatures of 500° C. The catalysts pretreated in this way have a very high selectivity, but a significantly lower activity than the known copper/zinc oxide catalysts $Cu/Zno/Cr_2O_3$ (30 wt. % Cu) and $Cu/ZnO/Al_2O_3$ (30 wt. % Cu). A detailed investigation of the PdZn alloy formation is described by N. Takezawa in "Selective PdZn alloy formation in the reduction Pd/ZnO catalysts", Bull. Chem. Soc. Jpn. 71, 1451–1455 (1998).

In "Steam reforming of methanol over Ni, Co, Pd and Pt supported on ZnO", React. Kinet. Catal. Lett. Vol. 55, No. 2, 349–353 (1995), it is shown that in addition to Pd/ZnO, also Pt/ZnO has a very high selectivity for the steam reforming of methanol.

In "New catalytic functions of Pd—Zn, Pd—Ga, Pd—In, Pt—Zn, Pt—Ga and Pt—In alloys in the conversions of methanol", Catal. Lett. 54 (1998) 119–123, N. Takezawa et al. describe catalysts for the reforming of methanol based on alloys of the type Pd—Zn, Pd—Ga, Pd—In, Pt—Zn, Pt—Ga and Pt—In. Of the tested catalysts, Pd/ZnO at 220° C. shows the greatest selectivity and activity in the steam reforming of methanol.

The known catalysts for the steam reforming of methanol based on palladium on zinc oxide exhibit a good carbon dioxide selectivity, which can be improved further by the selective formation of a palladium/zinc alloy. The specific hydrogen productivities of at most 2.7 $Nm^3/kg·h$ calculated from the disclosed data need to be improved further however.

Moreover the described catalysts of this type are without exception powdered catalysts, which are not particularly suitable for use in methanol reformers in vehicles. Although the catalyst powders can in principle be processed into shaped bodies such as for example tablets or spheres and then used in the form of a catalyst packing, the impaired accessibility of the reactants to the catalytically active centers in the interior of the shaped bodies automatically reduces the hydrogen productivity and thus the achievable space-time yield. This has correspondingly negative effects on the volume of the required reactor. The binders that may be needed for the shaping process reduce the hydrogen productivity still further. Furthermore, the vibrations and shocks caused when the vehicle is driven lead to an undesired abrasion of the shaped bodies, which blocks up the flow pathways in the packing and thereby steadily increases the pressure drop in the reactor.

The aforementioned coated catalysts could provide a remedy in these circumstances. Coated tests carried out by the inventors have shown however that Pd/ZnO catalyst powders form, on account of their basicity, a thixotropic coated dispersion that is difficult to process and leads into poorly reproducible coated results. In particular honeycomb bodies with a large number of cells can be coated only very inefficiently in this way.

The resulting coatings furthermore have an unsatisfactory adhesive strength. The addition of binders to the catalyst powder in order to obviate this defect is undesirable, since this reduces the achievable hydrogen productivity.

An object of the present invention is accordingly to provide a catalyst for the reforming of alcohols, in particular methanol, that has a high selectivity and specific hydrogen productivity. It is desirable that the catalyst has a hydrogen productivity of more than 20 $Nm^3/kg·h$ at a reactor temperature of 300° C., with at the same time a carbon dioxide selectivity of more than 95%. In addition the catalyst should be able to be used at a reactor temperature up to 400° C. A further essential aspect of the invention is the suitability of the catalyst for coated carrier bodies of ceramic material or metal without the addition of binders, which would reduce the specific productivity of the catalyst.

SUMMARY OF THE INVENTION

The above and other objects of the invention can be achieved by a catalyst for the steam reforming of alcohols that contains a palladium/zinc alloy and zinc oxide as catalytically active components. The catalyst is characterized in that the catalytically active components are deposited on at least one support material selected from the group consisting of aluminum oxide, aluminum silicate, titanium oxide, zirconium oxide, zeoliths and mixtures or mixed oxides thereof.

Preferably the catalyst according to the invention contains the palladium/zinc alloy in an amount of 0.5 to 10 wt. % and the zinc oxide in an amount of 1 to 50 wt. %, in each case referred to the total weight of the catalyst. The support material used for the catalyst should have a specific BET surface area (measured according to DIN 66132) of more than 5 m$^2$/g, preferably more than 50 m$^2$/g.

The catalyst is characterized by a high specific hydrogen productivity of more than 20 Nm$^3$/kg$_{cat}$·h at a reactor temperature of 300° C., which has not hitherto been achieved by the catalysts known in the prior art. If aluminum oxide is used as support-material, then the catalyst even has a specific hydrogen productivity of up to 60 Nm$^3$/kg$_{cat}$·h at a temperature of 350° C., with at the same time a carbon dioxide selectivity of more than 95%. This good value for the selectivity was unexpected, since as is known aluminum oxide promotes the formation of dimethyl ether as a by-product in the steam reforming of methanol (H. Takahashi et al; "Steam Reforming of methanol over Group VIII metals supported on SiO$_2$, Al$_2$O and ZrO$_2$"; React. Kinet. Catal. Lett., Vol. 52, No. 2, 303–307 (1994)). In contrast to the results quoted in this literature reference, no formation of dimethyl ether was observed with the catalyst according to the present invention.

An active aluminum oxide is preferably chosen as support material. Finely divided aluminum oxides exhibiting the crystal structures of the so-called transition phases of aluminum oxide and having high specific surfaces of up to 400 m$^2$/g are termed active aluminum oxides. Suitable active oxides include chi-, delta-, gamma-, kappa-, theta- and eta-aluminum oxide (see "Ullmann's Encyclopedia of Industrial Chemistry", fifth edition, Vol. A1, 560–562, 1985). In order to stabilize the aluminum oxide against thermal stresses, it may contain in a manner known per se a 0.5 to 10 wt. % of lanthanum oxide based on its total weight.

In a special embodiment the catalyst contains, in addition to at least one of the aforementioned support materials, also finely divided zinc oxide as support material for the catalytically active components. In this case too the catalyst preferably contains 0.5 to 10 wt. % of the palladium/zinc alloy and 1 to 50 wt. % of zinc oxide, in each case based on the total weight of the catalyst.

The catalyst may be formed into shaped bodies. Tablets, pellets, extrudates or granules are suitable as shaped bodies. The catalytically active components are in this case uniformly distributed over the cross-section of the shaped body. On account of the homogeneous distribution a large part of the catalytically active components is only insufficiently utilized on account of the poor accessibility for the reactants. Also, on account of the prolonged contact of the reactants with the catalytically active components in the interior of the shaped bodies there is an increased danger of the formation of by-products and thus of a decrease in the selectivity. It is therefore more appropriate if the support material is formed into shaped bodies and the catalytically active components, namely the PdZn alloy and zinc oxide, are present substantially in a 50 to 500 μm thick surface shell on the shaped bodies. In this way the catalytically active components are better utilized and the selectivity of the catalytic conversion is improved.

BRIEF DESCRIPTION OF DRAWINGS

The present invention will be further understood with reference to the accompanying FIG. 1 which shows a schematic representation of a testing apparatus used for testing the catalyst of the invention.

DETAILED DESCRIPTION OF INVENTION

Figure 1:
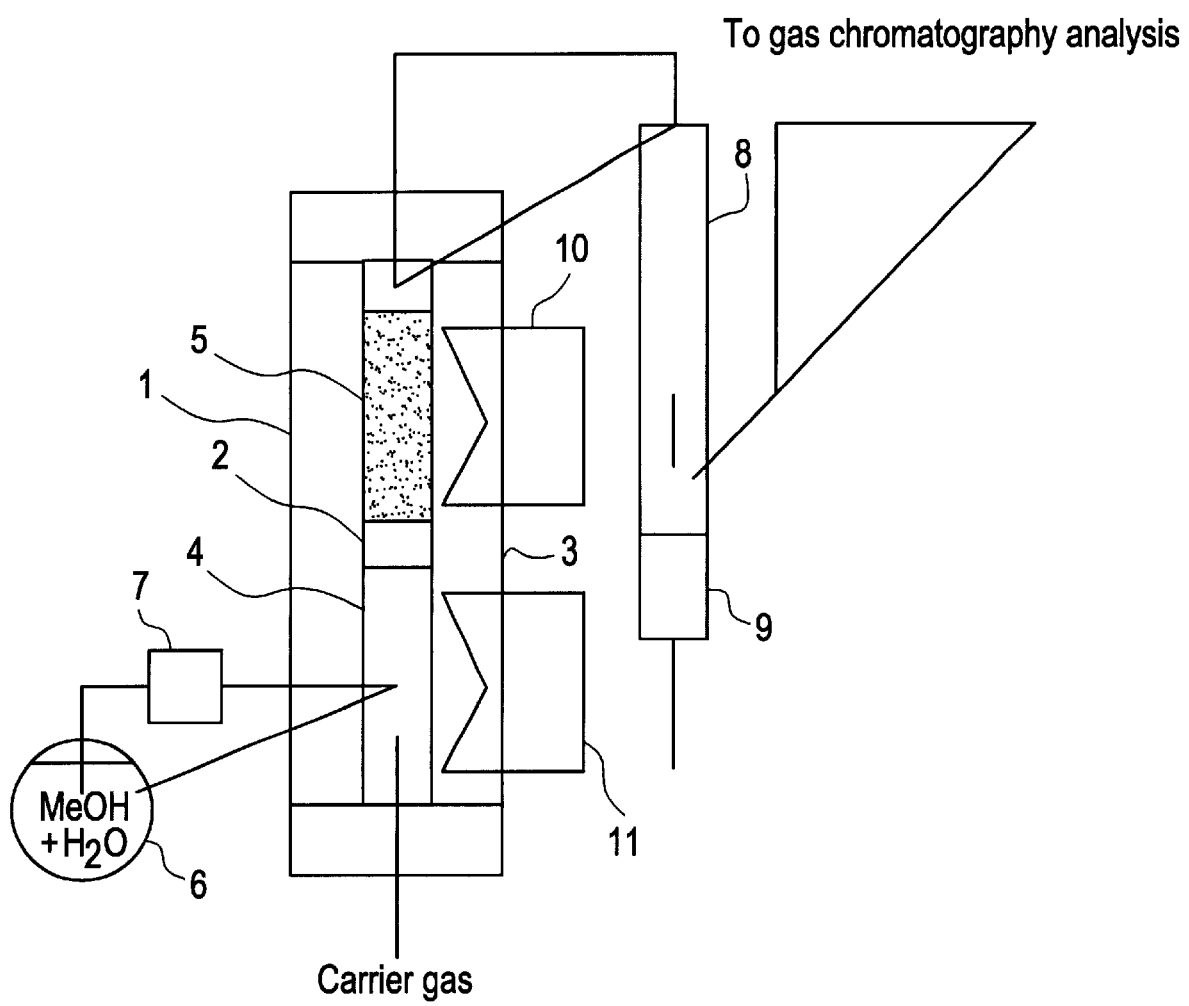

Preferably the catalyst according to the invention is used in the form of a coating on carrier bodies made of ceramic material or metal. Particularly suitable for this purpose are the known honeycomb bodies used to purify vehicle exhaust gases and having cell densities (number of flow channels per unit area of cross-section) of more than 10 cm$^{-2}$. In contrast to the known unsupported PdZn/ZnO alloy catalysts, an adherent coating on the conventional carrier bodies for catalysts can be produced with the supported alloy catalyst according to the invention and without the use of additional binders. Conventional carrier bodies also include metal sheets, heat exchanger plates, ceramic or metallic expanded bodies, and irregularly shaped structural parts. An essential feature of the catalyst according to the invention is that the alloy formation between palladium and zinc is as complete as possible, excess zinc in the catalyst being in the form of zinc oxide. As complete an alloy formation as possible can be ensured by adopting appropriate measures in the production of the catalyst.

One possible way of producing the catalyst according to the invention comprise impregnating the support material of the catalyst with a common, aqueous solution of soluble compounds of zinc and palladium, drying the impregnated material and calcining the catalyst precursor thus obtained in an oxidizing atmosphere at temperatures from 300° C. to 550° C., and then reducing the catalyst in a hydrogen-containing gas at temperatures from 350° C. to 500° C.

The calcination temperature after the impregnation of the support material must be chosen so that the soluble compounds of zinc and palladium are decomposed to the corresponding oxides. For this purpose temperatures of at least 300° C. are sufficient. Temperatures above 550° C. should be avoided since with increasing temperature there is an increased danger of the formation of a spinel between the support material and zinc oxide, especially when using aluminum oxide. The calcination time should be chosen so that the compounds of zinc and palladium are decomposed as fully as possible. This is achieved after 1 to 5 hours, depending on the chosen temperature.

After the calcination the catalyst is reduced in a hydrogen-containing gas at temperatures from 350° C. to 500° C., preferably from 350° C. to 450° C. The palladium-zinc alloy is formed under these conditions. As detailed investigations have shown, the formation of the alloy is facilitated if the support material is impregnated at the same time with the zinc and palladium compound and is then calcined. A sequential impregnation of the support material with the two compounds and an intermediate calcination leads to poorer hydrogen productivities and carbon dioxide selectivities in the steam reforming, which can be explained by an only incomplete alloy formation taking place between zinc and palladium.

Particularly suitable zinc and palladium compounds are nitrates and acetates, whose acid radicals can be completely removed in the calcination. If the alloy catalyst is produced in the form of a catalyst powder, inexpensive, chlorine-containing palladium compounds may also be used since the chlorine can be removed relatively easily from the powdered catalyst by repeated washing.

The aforedescribed production process can be applied to a support material present in the form of a finely divided powder. The subsequent shaping of the resultant catalyst material would however lead to a homogenous distribution of the catalytically active components over the cross-section of the shaped bodies, with the already described attendant disadvantages. It is therefore more advantageous to shape the support material first and then impregnate it with the catalytically active components. The result is that the catalytically active components are deposited on the shaped bodies substantially within a surface shell having a thickness in the range between 50 and 500 μm.

In order to produce a coated catalyst on a carrier body, the latter is conveniently first of all coated with the support material and the coating is then simultaneously impregnated with the two catalytically active components. This impregnation is followed by the afore described drying, calcination and reduction of the coating.

In order to produce a catalyst which contains zinc oxide as a further support material, zinc oxide together with at least one support material from the group comprising aluminum oxide, aluminum silicate, titanium oxide, zirconium oxide, zeoliths and mixtures or mixed oxides thereof, is dispersed in water. The resultant dispersion is basic. An acid solution of a palladium compound is added to this basic dispersion. The dispersion is next neutralized at elevated temperature with a base, for example sodium carbonate, and is then reduced at constant temperature with an aqueous reducing agent, filtered, washed, dried, calcined in an oxidizing atmosphere at temperatures from 300° C. to 550° C., and finally reduced in a hydrogen-containing gas at temperatures from 350° C. to 500° C., preferably from 350° C. to 450° C. A suitable aqueous reducing agent is a solution of formaldehyde and sodium hydroxide. Neutralization and reduction are preferably carried out at temperatures of the dispersion of from 50° C. to 90° C., in particularly from 70° C. to 90° C.

Alternatively the catalyst material can simply be washed after the wet chemical reduction and filtration, and then redispersed. A carrier body is then coated with the catalyst material using this dispersion. In order to prepare the coated catalyst the coating is dried, calcined in an oxidizing atmosphere at temperatures from 300° C. to 550° C., and then reduced in a hydrogen-containing gas at temperatures from 350° C. to 500° C.

A surprising feature of this procedure is that the palladium is also fully alloyed with the zinc, which can be recognised by the good carbon dioxide selectivities of a catalyst produced in this way, even though no soluble zinc compound that could be precipitated simultaneously together with the palladium compound is added to the dispersion. Obviously the zinc oxide added in the form of a finely divided powder is partially dissolved by the addition of the acidic noble metal solution. In the neutralization of the dispersion with sodium carbonate, palladium and the zinc that has passed into solution are then precipitated together on the zinc oxide as well as on the other support material. The good results for the carbon dioxide selectivity of such a catalyst demonstrate that the palladium has completely formed an alloy with zincin the reduction steps during the catalyst production.

The following examples and comparative examples serve to illustrate the invention further. Several catalysts according to the invention as well as comparison catalysts were produced. The catalysts were tested in an electrically heated reactor according to FIG. 1.

In FIG. 1 shows the reactor (1), with a reaction tube (2) arranged in the reactor, and a heating jacket (3) with two heating devices (10) and (11). An evaporator unit (4) consisting of a packing of glass spheres and heated by the heating device (11) is located in the lower part of the reaction tube (2). The mixture of water and methanol present in the receiver (6) is distributed by means of a liquid pump (7) over the heated glass spheres and evaporated. The mixture of methanol vapour and steam that is thereby formed is passed upwardly over a sample (5) of the catalyst to be tested, which is heated by the heating device (10). A sample of a honeycomb carrier body coated with catalyst is illustrated by way of example in FIG. 1. The product gas mixture is removed at the head of the reactor and passed to the condenser (8), in which the condensable constituents of the product gas are liquefied and then separated from the gaseous phase in the separator (9). The separated gaseous phase is analyzed as regards its constituents by means of gas chromatography. A carrier gas for the methanol vapour/steam mixture can be introduced at the lower end of the reactor (1).

The catalysts of the following examples and comparison examples were all tested at a stoichiometric ratio of water to methanol of 1.5 (steam-to-carbon ratio=S/C=1.5) and a space velocity of LHSV=5 h$^{-1}$ (LHSV: Liquid hourly space velocity), referred to methanol. The carbon dioxide selectivity $S_{CO2}$ according to equation (5), the concentration of carbon monoxide in the dry product gas as well as the specific hydrogen productivity $P_{Cat}$ according to equation (4), referred to the catalyst mass (excluding the mass of the optionally used carrier body), and the specific hydrogen productivity $P_{Pd}$, referred to the mass of palladium used, were measured in each case at various reaction temperatures. The results are summarized in Tables 1 to 5.

EXAMPLE 1:

A Coated Catalyst Was Produced on a Honeycomb Carrier Body as Follows:

A ceramic honeycomb body having 62 cells per square centimeter and a volume of 0.063 1 was coated with 7.25 g of γ-aluminum oxide by immersion in an aqueous dispersion of γ-aluminum oxide (specific surface: 140 m$^2$/g) and calcining for 2 hours at 600° C. After the calcination the coated honeycomb body was impregnated by immersion in a solution containing zinc nitrate and palladium nitrate (113.4 g Pd(NO$_3$)$_2$ and 768.5 g Zn(NO$_3$)$_2$.6H$_2$O in one liter of water). After calcining for 2 hours in air at 500° C., the honeycomb body was reduced for 2 hours at 400° C. in a stream of reforming gas (95 vol. % N$_2$ and 5 vol. % H$_2$).

The catalytically active coated of the catalyst produced in this way had a total weight of 8.78 g, corresponding to 139.3 g per liter volume of the honeycomb body. The coated catalyst contained 5.8 wt. % PdZn alloy, 11.6 wt. % ZnO and 82.6 wt. % Al$_2$O$_3$, in each case based on the total weight of the catalytically active coating.

TABLE 1

Reforming results on catalyst A.

| T [° C.] | $S_{CO2}$ [%] | CO-concentration in the dry product gas [Vol. %] | $P_{cat}$ $\left[\dfrac{Nm^3}{kg_{Cat} \cdot h}\right]$ | $P_{pd}$ $\left[\dfrac{Nm^3}{g_{Pd} \cdot h}\right]$ |
|---|---|---|---|---|
| 300 | 97 | 0.7 | 37.8 | 0.8 |
| 350 | 95 | 1.2 | 60.7 | 1.3 |
| 400 | 95 | 1.2 | 66.2 | 1.4 |

EXAMPLE 2:

A Pellet Catalyst B Was Produced as Follows:

An amount of 125 g of catalyst support (γ-aluminum oxide in the form of spheres 2–4 mm in diameter, specific surface 100 m$^2$/g) was impregnated according to the principle of pore volume impregnation with 0.088 1 of an aqueous solution of 2.49 g Pd(NO$_3$)$_2$ and 137 g Zn(NO$_3$)$_2$.6H$_2$O and dried for 15 minutes at 80° C. The volume of the solvent used corresponding roughly to the water uptake capacity of the support material. The impregnated catalyst supports were then calcined at 500° C. for 3 hours and finally reduced in a stream of reforming gas at 400° C. for 2 hours.

The final catalyst contained 1.2 wt. % PdZn alloy, 22.4 wt. % ZnO and 76.6 wt. % Al$_2$O$_3$, in each case referred to the total weight of the pellet catalyst. The PdZn alloy and zinc oxide were arranged in this catalyst substantially in a surface shell about 250 μm thick.

TABLE 2

Reforming results on catalyst B.

| T [° C.] | $S_{CO2}$ [%] | CO-concentration in the dry product gas [Vol. %] | $P_{cat}$ $\left[\dfrac{Nm^3}{kg_{Cat} \cdot h}\right]$ | $P_{pd}$ $\left[\dfrac{Nm^3}{g_{Pd} \cdot h}\right]$ |
|---|---|---|---|---|
| 220 | 95 | 1.2 | 1.0 | 0.1 |
| 220 | 95 | 1.2 | 1.0 | 0.1 |
| 300 | 95 | 1.2 | 3.4 | 0.7 |
| 350 | 96 | 1.0 | 8.2 | 1.2 |
| 400 | 93 | 1.8 | 9.4 | 1.3 |

The catalysts A and B were produced by co-impregnation of aluminum oxide with palladium nitrate and zinc nitrate. Comparable selectivities were achieved with both catalysts, a deterioration in the pellet catalyst being observed at 400° C. A possible explanation of this is the following: the pellet catalyst B is a shell catalyst with a shell thickness of about 250 μm. The core of the catalyst consists almost exclusively of pure aluminum oxide. At relatively high temperatures there is also the increasing probability that the reactants will diffuse into the core of the catalyst. Contact between the methanol and the pure aluminum oxide leads however to undesired secondary reactions that impair the selectivity.

The catalysts exhibit marked differences with regard to the hydrogen productivity per kilogram of catalyst and per hour. The lower values in the case of the pellet catalyst B are explained by the high proportion of catalytically inactive support material in the core of the pellets. Measurement of the hydrogen productivity per gram of palladium confirms this assumption. This is roughly the same for both catalysts and demonstrates that the catalytically active components of the pellet catalyst are completely located in a surface shell that is easily accessible to the reactants.

EXAMPLE 3:

A Further Coated Catalyst C Was Produced as Follows:

A dispersion of 36.6 g of γ-aluminum oxide (specific surface 140 m²/g) and 11.9 g of ZnO in 400 ml of water was prepared, to which a solution of 5.88 g of $H_2PdCl_4$ in 100 ml of water was added. The dispersion was heated to 80° C. and neutralized with sodium carbonate. 12 ml of an aqueous solution of 1.65 g of formaldehyde and 0.6 g of sodium hydroxide was then added at 80° C. After stirring for 15 minutes the dispersion was filtered off and washed three times with 500 ml of water. The solid obtained was redispersed with 250 ml of water.

A ceramic honeycomb body containing 62 cells per square centimeter and having a volume of 0.063 l was coated with 6.3 g of solid by immersion in the coated dispersion thus obtained followed by calcination for 2 hours at 400° C. The honeycomb body was then reduced for 2 hours at 400° C. in a stream of reforming gas.

The catalytically active coating of the catalyst C had the following composition: 8.1 wt. % PdZn alloy, 19.7 wt. % ZnO and 72.2 wt. % $Al_2O_3$, in each case referred to the total weight of the coating.

TABLE 3

Reforming results on catalyst C.

| T [° C.] | $S_{CO2}$ [%] | CO-concentration in the dry product gas [Vol. %] | $P_{cat}$ $\left[\dfrac{Nm^3}{kg_{Cat} \cdot h}\right]$ | $P_{pd}$ $\left[\dfrac{Nm^3}{g_{Pd} \cdot h}\right]$ |
|---|---|---|---|---|
| 300 | 97 | 0.7 | 24.3 | 0.5 |
| 350 | 98 | 0.5 | 40.8 | 1.2 |
| 400 | 97 | 0.7 | 51.9 | 1.3 |

Catalyst C is characterized by a very high selectivity and correspondingly low CO contents in the reformate. Compared to catalyst A however it has a lower hydrogen productivity.

COMPARISON EXAMPLE 1

A Pellet Catalyst D Was Produced as Follows:

An amount of 100 g of zinc oxide tablets were impregnated according to the principle of pore volume impregnation with 0.030 l of an aqueous solution of 2.49 g $Pd(NO_3)_2$ and dried for 15 minutes at 80° C. The pretreated catalyst supports were then calcined at 500° C. for 3 hours and finally reduced at 400° C. for 2 hours in a stream of reforming gas.

The catalyst D consisted of 1.8 wt. % PdZn alloy and 98.2 wt. % ZnO.

TABLE 4

Reforming results on catalyst D.

| T [° C.] | $S_{CO2}$ [%] | CO-concentration in the dry product gas [Vol. %] | $P_{cat}$ $\left[\dfrac{Nm^3}{kg_{Cat} \cdot h}\right]$ | $P_{pd}$ $\left[\dfrac{Nm^3}{g_{Pd} \cdot h}\right]$ |
|---|---|---|---|---|
| 220 | 82 | 4.5 | 0.11 | 0.024 |
| 300 | 78 | 5.5 | 0.60 | 0.13 |
| 350 | 79 | 5.3 | 0.85 | 0.19 |
| 400 | 81 | 4.8 | 1.22 | 0.27 |

The catalyst D has an extremely low hydrogen productivity, which can be explained by the large proportion of difficultly accessible zinc oxide. Surprisingly the selectivity that is achieved is significantly inferior to that of the known powdered catalysts in the literature.

COMPARISON EXAMPLE 2

A Coated Catalyst E Was Produced as Follows:

A ceramic honeycomb body containing 62 cells per square centimeter and a volume of 0.063 l was coated with 7.25 g of γ-aluminum oxide by immersion in an aqueous dispersion of γ-aluminum oxide (specific surface 140 m²/g) followed by calcining for 2 hours at 600° C. The coated honeycomb body was then impregnated by immersion in a solution containing zinc nitrate (768.5 g $Zn(NO_3)_2.6H_2O$ in one liter of water).

After calcining for 2 hours at 500° C. the honeycomb body was impregnated by immersion in an aqueous solution of palladium nitrate (113.4 g $Pd(NO_3)_2$ in one liter of water, calcined for 2 hours at 500° C., and reduced for a further 2 ours at 400° C. in a stream of reforming gas.

The catalytically active coating of the catalyst E had the following composition: 3.5 wt. % palladium, 14.3 wt. % ZnO and 82.2 wt. % $Al_2O_3$.

TABLE 5

Reforming results on catalyst E.

| T [° C.] | $S_{CO2}$ [%] | CO-concentration in the dry product gas [Vol. %] | $P_{cat}$ $\left[\dfrac{Nm^3}{kg_{Cat} \cdot h}\right]$ | $P_{pd}$ $\left[\dfrac{Nm^3}{g_{Pd} \cdot h}\right]$ |
|---|---|---|---|---|
| 300 | 55 | 11.3 | 12.7 | 0.3 |
| 350 | 60 | 10.0 | 25.1 | 0.6 |
| 400 | 64 | 9.0 | 26.3 | 0.7 |

As the results of Table 5 demonstrate, catalyst E has a lower hydrogen productivity as well as a reduced selectivity compared to catalyst A. These differences are probably due to the fact that catalyst A was produced by co-impregnation of the aluminum oxide coated with palladium nitrate and zinc nitrate, whereas catalyst E was obtained by sequential impregnation of the aluminum oxide coated. Obviously the co-impregnation of palladium and zinc facilitates the formation of the PdZn alloy.

The catalyst according to the invention is also suitable for the autothermal steam reforming of alcohols in addition to the steam reforming of alcohols according to reaction equation (1). In this process an oxygen-containing gas mixture is admixed with the gaseous educt stream. The energy required for the endothermic steam reforming is generated in this instance, by a partial oxidation of the methanol in the reactor.

Further variations and modifications of the foregoing will be apparent to those skilled in the art and are intended to be encompassed by the claims appended hereto.

German priority application 199 11 0069.4 filed on May 22, 1999 is relied on and incorporated herein by reference.

We claim:

1. A method for steam reforming methanol, comprising:
    contacting said methanol and stoichiometric excess of water with a catalyst that contains a palladium/zinc alloy and zinc oxide as catalytically active components,
    wherein the catalytically active components are deposited on at least one support material selected from the group consisting of aluminum oxide, aluminum silicate, titanium oxide, zirconium oxide, a zeolite and mixtures or mixed oxides thereof.

2. The method according to claim 1, wherein the catalyst comprises from 0.5 to 10 wt. % of the palladium/zinc alloy, based on the total catalyst weight.

3. The method according to claim 1, wherein the catalyst comprises from 1 to 50 wt. % of zinc oxide, based on the total catalyst weight.

4. The method according to claim 1, wherein the support material is an aluminum oxide with a specific surface of more than 10 $m^2/g$.

5. The method according to claim 4, wherein the catalyst further comprises 0.5 to 10 wt. % of lanthanum oxide, based on the combined total weight of aluminum oxide and lanthanum oxide.

6. The method according to claim 1, wherein the zinc oxide is present as additional support material for the catalytically active components.

7. The method according to claim 1, wherein the catalyst is formed into shaped bodies.

8. The method according to claim 1, wherein the support material is formed into shaped bodies and the catalytically active components are present on the shaped bodies in a surface layer of 50 to 500 $\mu$m thick.

9. The method according to claim 1, wherein the catalyst is present in the form of a coating on a support body.

10. The method according to claim 9, wherein the catalyst in the steam reforming of methanol has a hydrogen productivity of more than 20 $Nm^3/kg \cdot h$ at a reactor temperature of 300° C.

11. The method according to claim 1, wherein the steam reforming is carried out autothermally.

12. A method for steam reforming methanol, comprising:
    contacting said methanol with a catalyst that contains a palladium/zinc alloy and zinc oxide as catalytically active components,
    wherein the catalytically active components have previously been deposited by simultaneous impregnation on at least one support material selected from the group consisting of aluminum oxide, aluminum silicate, titanium oxide, zirconium oxide, a zeolite and mixtures or mixed oxides thereof.

13. A method for steam reforming methanol with a hydrogen productivity of more than 20 $Nm^3$ of hydrogen per kilogram of catalyst an hour, comprising:
    contacting said methanol at a temperature from 300 to 400° C. with a catalyst coated on a carrier body, said catalyst comprising a palladium/zinc alloy and zinc oxide as catalytically active components,
    wherein the catalytically active components are deposited on at least one support material selected from the group consisting of aluminum oxide, aluminum silicate, titanium oxide, zirconium oxide, a zeolite and mixtures or mixed oxides thereof.

* * * * *